(12) United States Patent
Potiagalov et al.

(10) Patent No.: US 8,745,706 B2
(45) Date of Patent: Jun. 3, 2014

(54) SECURE COMMUNICATION OF DISTRIBUTED RUBY REQUESTS

(75) Inventors: Alexei Potiagalov, Richmond (CA); Cheong-Wei Chu, Burnaby (CA)

(73) Assignee: Business Objects Software Limited, Dublin (IE)

(*) Notice: Subject to any disclaimer, the term of this patent is extended or adjusted under 35 U.S.C. 154(b) by 5 days.

(21) Appl. No.: 13/470,359

(22) Filed: May 14, 2012

(65) Prior Publication Data
US 2013/0305326 A1 Nov. 14, 2013

(51) Int. Cl.
*H04L 29/06* (2006.01)
*H04L 29/08* (2006.01)

(52) U.S. Cl.
CPC ............. *H04L 63/08* (2013.01); *H04L 67/02* (2013.01); *H04L 69/08* (2013.01)
USPC .................. 726/5; 726/14; 709/203; 713/158

(58) Field of Classification Search
None
See application file for complete search history.

(56) References Cited

U.S. PATENT DOCUMENTS

| | | | | |
|---|---|---|---|---|
| 6,519,643 | B1* | 2/2003 | Foulkes et al. | 709/227 |
| 6,631,417 | B1* | 10/2003 | Balabine | 709/229 |
| 7,359,933 | B1* | 4/2008 | Polen et al. | 709/203 |
| 8,204,931 | B2* | 6/2012 | Stanev et al. | 709/203 |
| 2005/0246716 | A1* | 11/2005 | Smith et al. | 719/315 |
| 2006/0265335 | A1* | 11/2006 | Hogan et al. | 705/65 |
| 2007/0192503 | A1* | 8/2007 | McCollum et al. | 709/230 |
| 2007/0206584 | A1* | 9/2007 | Fulling et al. | 370/356 |
| 2007/0244848 | A1* | 10/2007 | Chu | 707/1 |
| 2008/0270795 | A1* | 10/2008 | Lonardo et al. | 713/168 |
| 2008/0289039 | A1* | 11/2008 | Rits et al. | 726/22 |
| 2008/0301783 | A1* | 12/2008 | Abrutyn et al. | 726/5 |
| 2010/0094875 | A1* | 4/2010 | Harrison et al. | 707/741 |
| 2010/0284411 | A1* | 11/2010 | Mirani et al. | 370/400 |
| 2010/0329173 | A1* | 12/2010 | Murphy et al. | 370/313 |
| 2011/0066593 | A1* | 3/2011 | Ahluwalia et al. | 707/624 |
| 2011/0138457 | A1* | 6/2011 | Jolfaei | 726/14 |
| 2011/0235108 | A1* | 9/2011 | Kato | 358/1.15 |
| 2011/0246979 | A1* | 10/2011 | Deruelle | 717/174 |
| 2012/0137010 | A1* | 5/2012 | Diehl et al. | 709/228 |
| 2012/0254372 | A1* | 10/2012 | Vandendorpe | 709/220 |

OTHER PUBLICATIONS

Perrone, "Enhancing the Credibility of Wireless Network Simulations with Experiment Automation", IEEE International Conference on Wireless & Mobile Computing, Networking & Communication, 2008, pp. 631-637.*

Seki, "dRuby and Rinda: Implementation and Application of Distributed Ruby and its Parallel Coordination Mechanism", Int J Parallel Prog, 2009, pp. 37-57.*

Anonymous; Distributed Ruby; Wikipedia; May 2012; 1 page; http://en.wikipedia.org/w/index.php?title=Distributed_Ruby&oldid=382768663.

(Continued)

*Primary Examiner* — Andrew Nalven
*Assistant Examiner* — Walter Malinowski

(57) ABSTRACT

Various embodiments of systems and methods for providing a secure communication are described herein. A client application generates a Distributed Ruby (DRb) request based on a request received from a user. The obtained DRb request is wrapped to obtain an HTTPS request, which includes the DRb request and one or more authentication information. The generated HTTPS request is forwarded to an HTTPS server, which verifies the HTTPS request based on the authentication information. The HTTPS request is then unwrapped to obtain the DRb request, which is executed by a DRb server to obtain a result of execution of the DRb request.

17 Claims, 7 Drawing Sheets

(56) References Cited

OTHER PUBLICATIONS

Seki, M et al; "dRuby and Rinda: implementation and application of distributed Ruby and its parallel coordination mechanism"; published in International Journal of Parallel Programming; Feb. 2009; pp. 20; http://dl.acm.org/citation.cfm?id=1598916.

Rescorla, E et al; The Secure HyperText Transfer Protocol; published online Aug. 1999; pp. 45; http://tools.ietf.org/html/rfc2660.

* cited by examiner

US 8,745,706 B2

SECURE COMMUNICATION OF DISTRIBUTED RUBY REQUESTS

FIELD

Embodiments generally relate to computer systems, and more particularly to methods and systems for secure communication of distributed Ruby requests.

BACKGROUND

Client-Server applications are the backbone of many businesses and aid in their smooth functioning by providing the ability to input, process, store and access data irrespective of the difference in time and geographic location as well as difference in the position of the device of accessibility. Various communication protocols are used for communicating between the client and the server application. A popular communication protocol for client server communication is a Distributed Ruby (DRb) protocol, due to the ease of connecting Ruby programs over a network. However, client-server communication using the DRb protocol may not meet the security requirements of several organizations.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for secure communication of distributed ruby requests are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
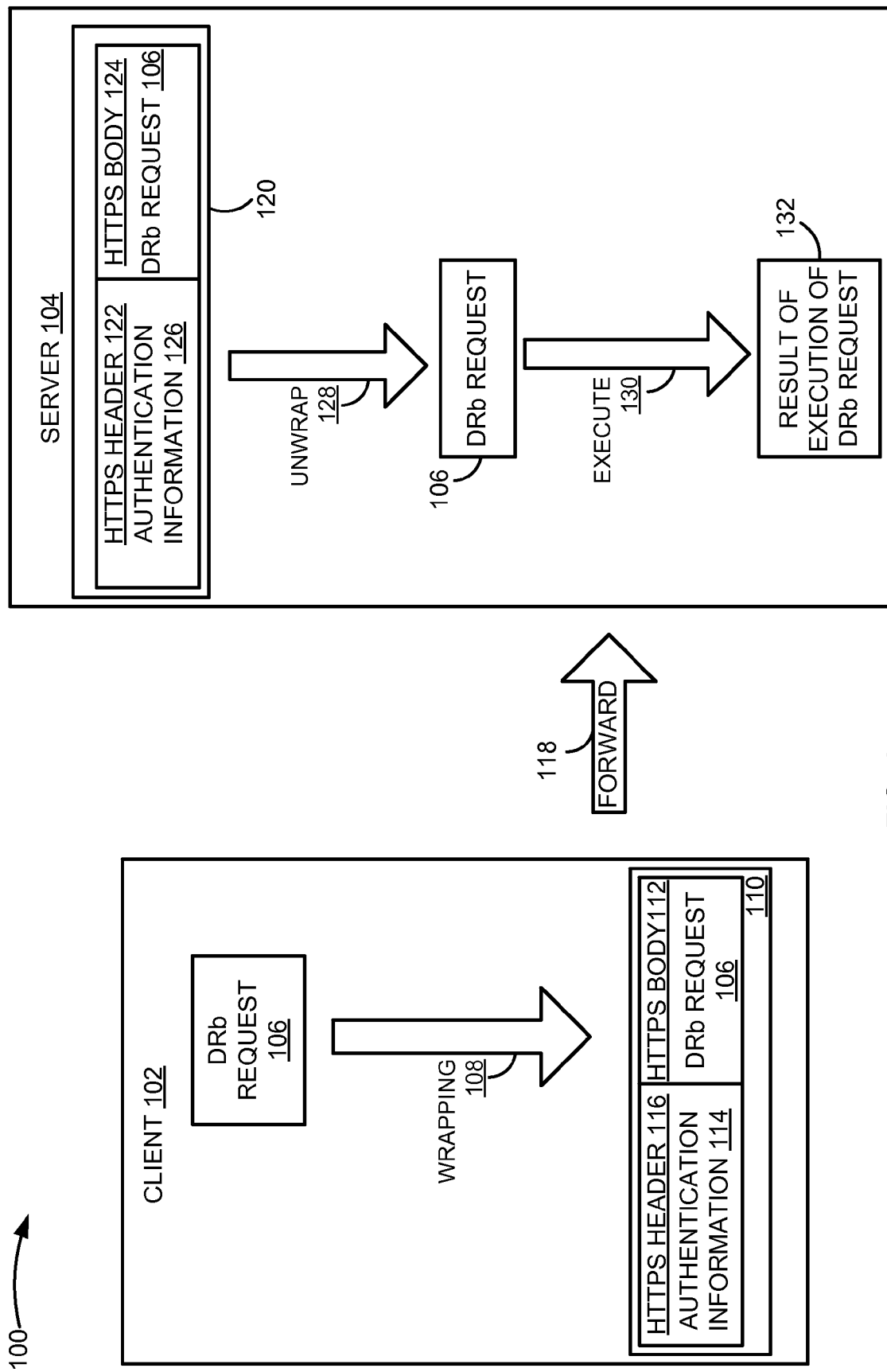
FIG. 1 is a block diagram illustrating a method for providing a secure communication between a client and a server, according to an embodiment.

FIG. 1 is a block diagram illustrating a method 100 for providing a secure communication between a client 102 and a server 104, according to an embodiment. In one embodiment, the method 100 may provide a secure communication for communicating a Distributed Ruby (DRb) request 106 from the client 102 to the server 104. The client 102 may generate the DRb request 106 based on a user request. The user request may be received by the client 102 for retrieving information from a server 104 or for accessing any other service provided by the server 104. Distributed Ruby, or DRb, allows Ruby programs to communicate with each other on the same machine or over a network. DRb is a library that allows communication with remote Ruby objects and programs, using TCP/IP network protocols. References to objects can be passed between different Ruby processes. DRb uses remote method invocation (RMI) to pass commands and data between processes. Using DRb, a Ruby process may act as a server, a client, or both.

Initially wrapping 108 may be performed on the DRb request 106 to obtain a Hypertext Transfer Protocol Secure (HTTPS) request 110. Hypertext Transfer Protocol Secure (HTTPS) is a combination of the Hypertext Transfer Protocol (HTTP) and the SSL/TLS protocol. HTTPS provides encrypted communication to prevent eavesdropping and secure identification of a network web server. During connecting to a website HTTPS protects from passive and active network attacks such as Man-in-the-middle attacks. During a session, HTTPS can protect against eavesdropping and tampering with the contents of the site or with the information sent to the site. Wrapping 108 is a process of creating the HTTPS request 110 containing the DRb request 106. Wrapping 108 may be performed by storing the DRb request 106 in the HTTPS request 110. In one embodiment, the DRb request 106 may be stored in the body 112 of the HTTPS request 110 and authentication information 114 may be stored in a header 116 of the HTTPS request 110. In another embodiment, the DRb request 106 may be stored in the header 116 of the HTTPS request 110. The authentication information 114, stored in the header 116 of the HTTPS request 110, may include a user name/password of a user, a session identification of the session between the client 102 and the server 104, or any other authentication information.

Next, the obtained HTTPS request 110 is forwarded 118 to the server 104. The forwarded HTTPS request 120 includes an HTTPS header 122 and an HTTPS body 124. The authentication information 126 included in the header 122 of the forwarded HTTPS request 120 may then be verified. In case the authentication information 126 included in the HTTPS header 122 is verified, then the HTTPS request 120 may be unwrapped 128 to obtain the DRb request 106. Finally, the obtained DRb request 106 may be executed 130 to obtain a result of execution of the DRb request 132. The obtained result of execution of the DRb request 132 may be provided to the client 102.

Figure 2A:
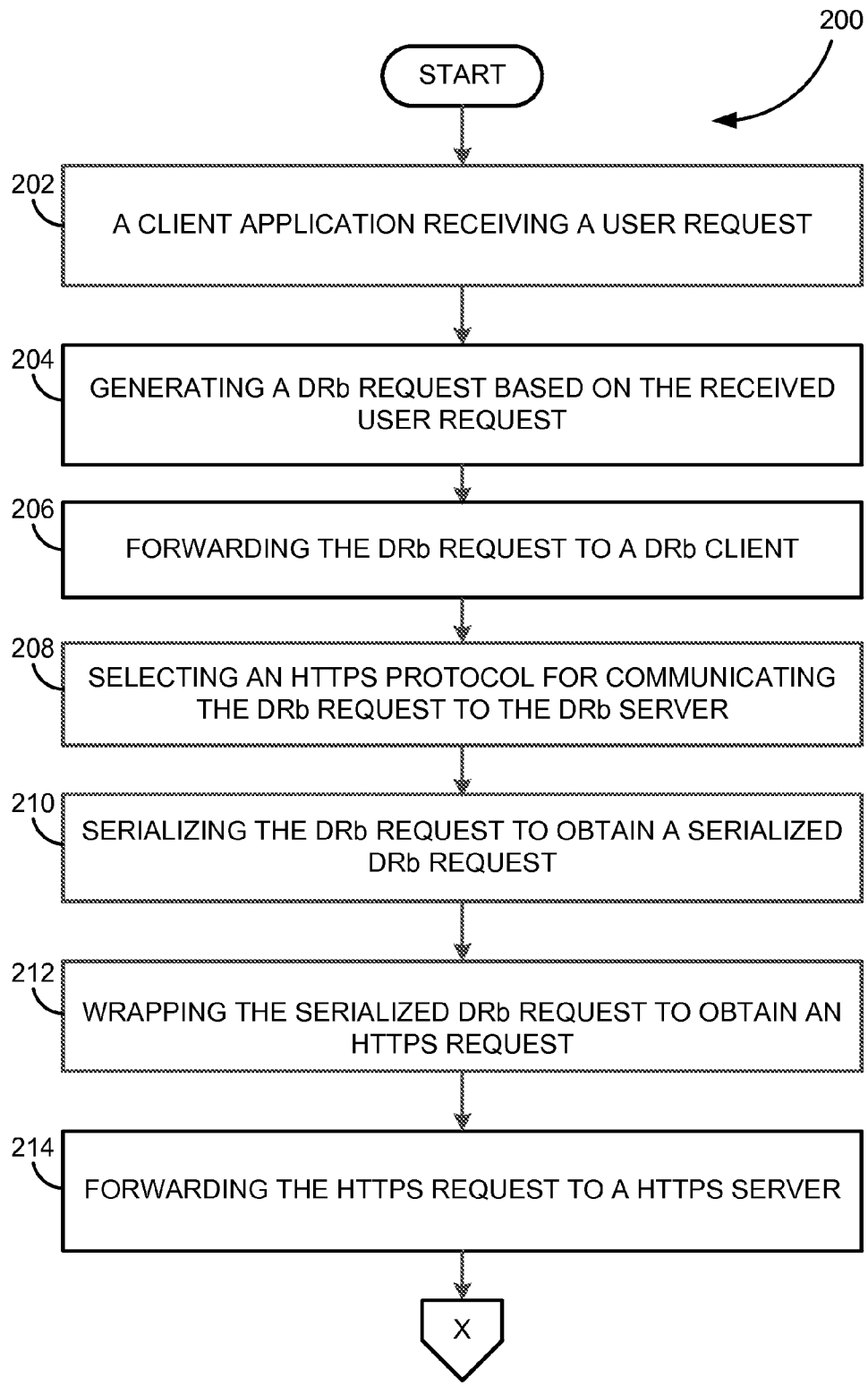
FIGS. 2A-2C is a detailed flow diagram illustrating a method for performing secure communication, according to an embodiment.
Figure 2B:
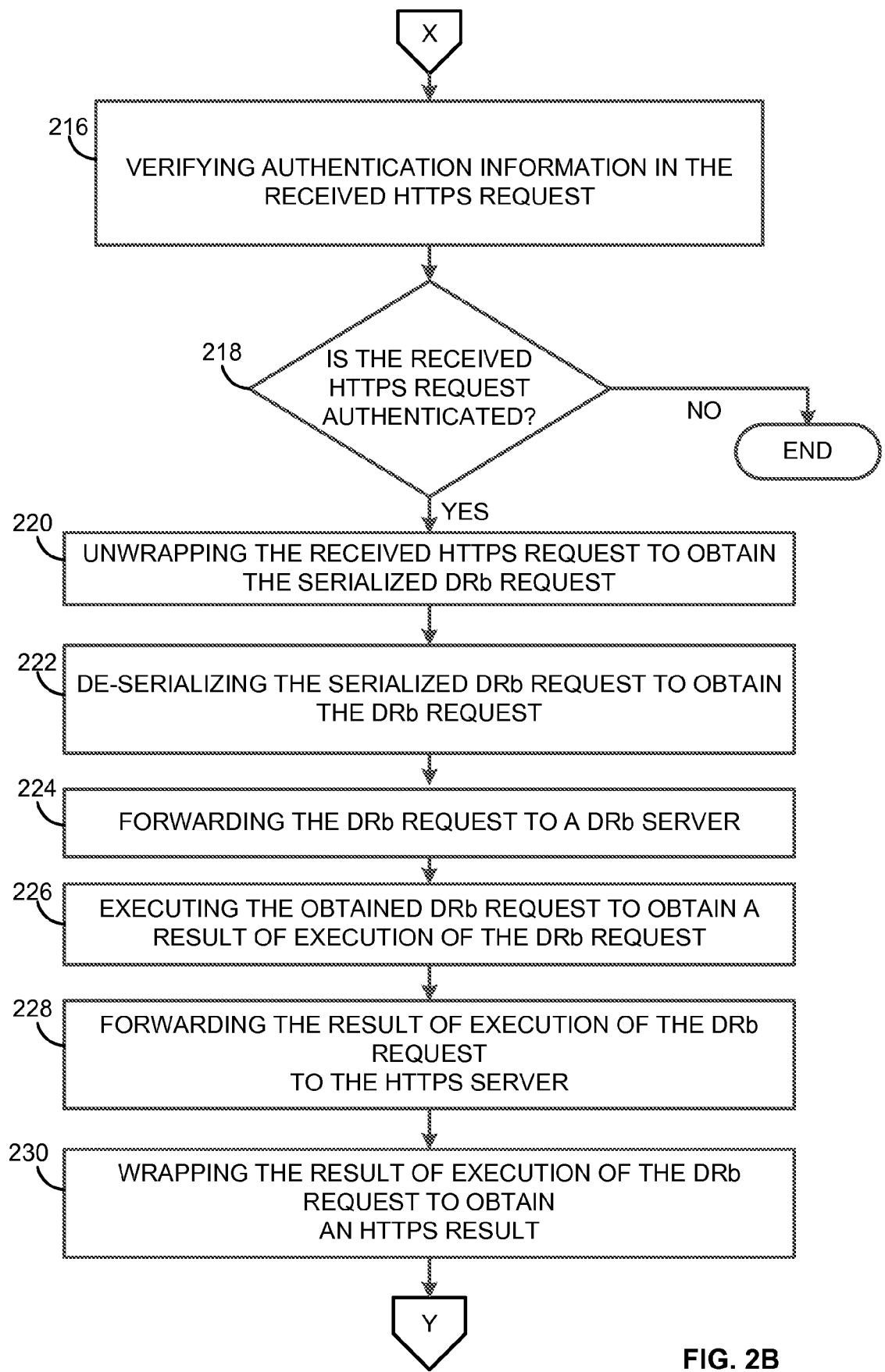
Figure 2C:
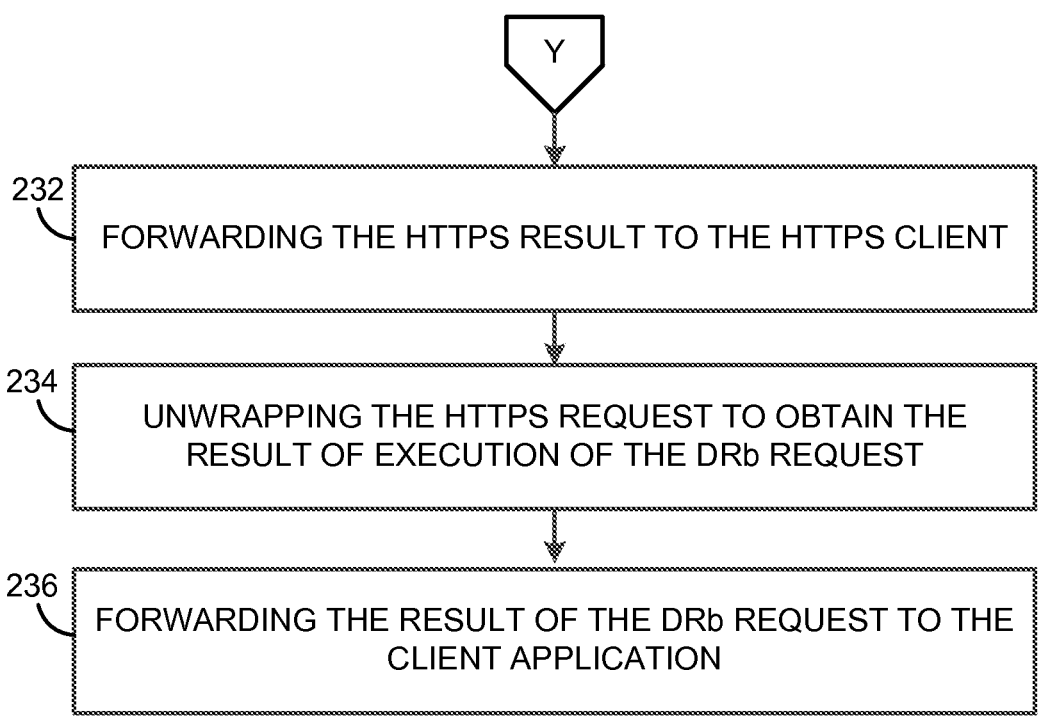

FIGS. 2A-2C is a detailed flow diagram 200 illustrating a method for performing secure communication, according to an embodiment. Initially at block 202 a client application receives a user request. The user request may be received for retrieving information from a server or for performing actions on the server. A client application may be a software application that accesses a service made available by a server. The user request may include a request for accessing data available on a server. The user request may also include an authentication information such as user identification and password of the user or single sign-on information of the user. The client application may provide a front end for receiving the user request. For example, a company information application may receive a user request for a list of company clients. The user request may also include a user name "VZR" and a password "frt #56" of the user.

Next at block 204 the client application generates a Distributed Ruby (DRb) request based on the user request received at block 202. The DRb request may include a Ruby method corresponding to the received user request. The DRb request may also include a Ruby Object for executing the DRb request. A Ruby method is an expression that returns a value. The Ruby method may return values based on parameters included in the expression. The Ruby object handles the execution of the DRb request. The Ruby object may include a method that is to be executed during the execution of the DRb request. In one embodiment, a client application component may generate the DRb request. A client application component is a portion of the client application defined to generate the DRb request. In the above example, the user request for providing a list of customers may be converted into a DRb request that includes a Ruby Object "Client" and a Ruby method "Clients.list_all( )" for retrieving the list of company clients.

Next at block 206 the generated DRb request is forwarded to a DRb client. A DRb client is a Ruby library defined to send the DRb request to a DRb server using a DRb protocol. The DRb client is defined in a DRb library. The DRb library provides a way to share objects over the network, allowing Ruby clients to easily connect to share objects and use these objects.

In one embodiment, DRB allows selecting a transport layer protocol (implementation) for transporting the DRb request. In computer networking, the transport layer provides end-to-end communication services for applications within a layered architecture of network components and protocols. In one embodiment, a Hypertext Transfer Protocol—Secure (HTTPS) is selected for transporting the DRb request to the DRb server (block 208). In one embodiment, a HTTPS client may be registered with the DRb client for transporting the DRb request. Based on the registration, a DRb client may send all the DRb requests, received by the DRb client, to the registered HTTPS client. An HTTPS client is a client application that used a Ruby HTTPS library for HTTPS communication.

A serialization operation may then be performed on the obtained DRb request (block 210). Serialization is the process of converting an object into a stream of bytes in order to persist it to memory, a database, or a file. Its main purpose is to save the state of an object in order to be able to recreate it when needed. Serialization of the object may be performed for easy transportation of the object from one domain to another or through a firewall. A serialized DRb request may be obtained after performing the serialization operation on the DRb request.

Next at block 212, a wrapping operation may be performed on the serialized DRb request to obtain an HTTPS request. A wrapping operation is an act of creating an HTTPS request containing the serialized DRb request. The HTTPS request may include a HTTPS header and a HTTPS body. In one embodiment, the serialized DRb request obtained at block 210 may be stored in the HTTPS header. The serialized DRb request may be stored in the HTTPS header if the DRb request is a GET request. A GET request may be received for requesting a representation of a specified server resource. In another embodiment, the serialized DRb request may be stored in the body of the HTTPS request. The DRb request may be stored in the HTTPS BODY if the DRb request is a PUT request or a POST request. A PUT request may be received for uploading a representation of a specified server resource. A POST request may be received for submitting data to be processed to a server resource. In case, the DRb request is a DELETE request then the DRb request may be stored in either the header or the body of the HTTPS request. A DELETE request may be received for deleting a specific server resource. The HTTPS header may include authentication information, such as the user name and password of the user received at block 202, for securely identifying the user sending the request. In the above example, the user name "VZN" and the password ""frt #56" may be stored in the header of the HTTPS request.

In one embodiment, the HTTPS client may send a request for session identification to an HTTPS server. A session identification, session identifier, session ID or session token is a piece of data that is used in network communications to identify a session, or a series of related message exchanges. Session identifiers may be used in cases where the communications infrastructure uses a stateless protocol such as HTTP. For example, a buyer who visits a seller's site wants to collect a number of articles in a virtual shopping cart and then finalize the shopping by going to the site's checkout page. This typically involves an ongoing communication where several webpages are requested by the client and sent back to them by the server. In such a situation, it is vital to keep track of the current state of the shopper's cart, and a session ID is one way to achieve that goal. Based on the received request, the HTTPS server may send back a session identifier identifying the session to the HTTPS client. The obtained session identification may then be stored in the HTTPS header of the HTTPS request.

In one embodiment, during the wrapping operation, an HTTPS verb may be generated corresponding to the DRb request generated at bock 204. The HTTP defines eight methods or "verbs" that indicate actions to be performed on a resource. The HTTP methods includes: HEAD, GET, POST, PUT, DELETE, TRACE, OPTIONS and CONNECT. The generated HTTP verb may define the action to be performed for executing the DRb request. The generated HTTPS verb may then be stored in the HTTPS header of the HTTPS request. In the above example, an HTTPS verb "GET" may be generated based on the DRb request "Clients.list_all( )". The GET method is defined to request a representation of the specified resource. Requests using GET should only retrieve data and should have no other effect. The HTTP verb GET may be stored in the HTTPS header of the HTTPS request.

Next at block 214 the generated HTTPS request may be forwarded to an HTTPS server. In one embodiment, the HTTPS client may use the HTTPS library to send the HTTPS request to the HTTPS server. The HTTPS client may forward the generated HTTPS request to the HTTPS server by initiating a communication with the HTTPS server. After forwarding the HTTPS request, the HTTPS client may wait for receiving a response from the HTTPS server. In one embodiment, an HTTPS server is a standalone or a built-in HTTPS server.

Next at block 216, the authentication information included in the header section of the HTTPS request received by the HTTPS server at block 214 may be verified. For example, the HTTPS server may compare the user name and password stored in the HTTPS header of the received HTTPS request with a list of user name/password pairs stored in the HTTPS server for verifying the received HTTPS request. Based on the verification, a determination is made whether the HTTPS request received at block 214 is authenticated (block 218). In the above example, the user name "VZN" and the password ""frt #56"" may be compared with the list of user name/password stored in the HTTPS server to determine whether the HTTPS request received by the HTTPS server is authenticated.

Next in case the HTTPS request is authenticated (condition in block 218 is true), the received HTTPS request is unwrapped to obtain the serialized DRb request stored in the body of the HTTPS request (block 220). Unwrapping is a process of retrieving the serialized DRb request from the HTTPS request. The obtained serialized DRb request may then be de-serialized to obtain the DRb request (block 222). In the above example, if the DRb request is authenticated then the serialized DRb request stored in the header or the body of the HTTPS requested may be retrieved and de-serialized to obtain the DRb request, which includes the Ruby Object "Client" and a Ruby method "Clients.list_all( )".

Next at block 224, the DRb request obtained at block 222 may be forwarded to a DRb server. In one embodiment, the HTTPS server may be configured to route all DRb requests to the DRb sever. A DRb server is a program defined to process a DRb request. The DRb server may execute the DRb request to obtain a result of execution of the DRb request (block 226). In one embodiment, the DRb server may forward the DRb request to the Ruby object included in the DRb request. The Ruby object may execute the method included in the DRb request to obtain the result of execution of the DRb request. In the above example, the DRb request may be executed by the DRb server to obtain a list of clients ("ABC INC.", "XYZ CORP.)

Next at block 228, the obtained result of execution of the DRb request is forwarded to the HTTPS server. The obtained result of execution of the DRb request may then be wrapped to obtain an HTTPS result that stores the result of execution of the DRb request (block 230). The DRb result may be stored in the body of the HTTPS result. Next at block 232, the HTTPS result may be forwarded to the HTTPS client. The HTTPS request may be forwarded to the HTTPS client in response to the communication initiated by the HTTPS client. The HTTPS request may then be unwrapped to obtain a result of execution of the DRb request (block 234). The obtained result of execution of the DRb request may finally be forwarded to the client application that received the user request (block 236). In the above example, the list of client is finally forwarded to the client application that received the request for client information.

Figure 3:
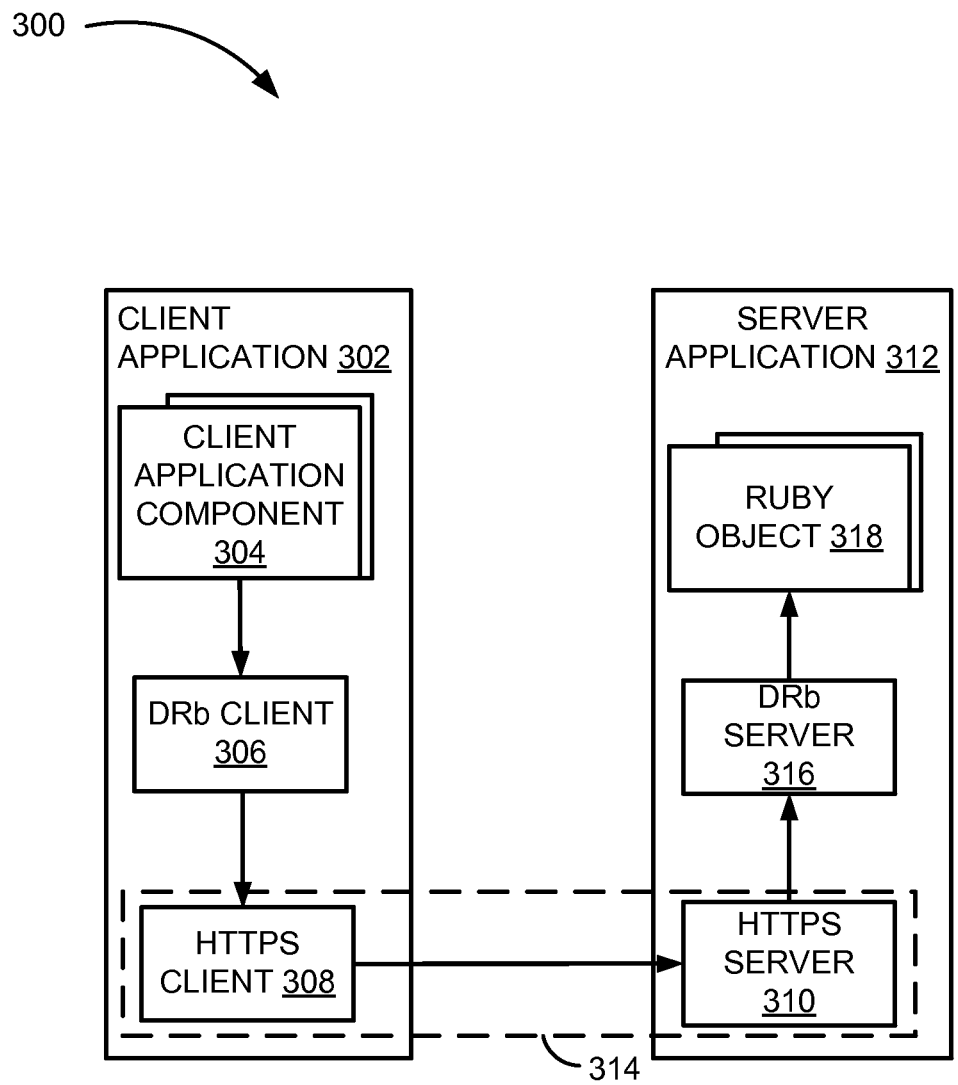
FIG. 3 is a block diagram illustrating a system for performing a secure communication, according to an embodiment.

FIG. 3 is a block diagram 300 illustrating a system for performing a secure communication, according to an embodiment. The client application 302 includes a client application component 304, which receives a user's request and generates the DRb request based on the received user request. The client application component 304 then forwards the generated DRb request to a DRb client 306. The DRb client 306 is a part of standard DRb library. The DRb client 306 forwards the DRb request to an HTTPS client 308 registered with the DRb client 306. The HTTPS client 308 may store a code for serializing the DRb request and wrapping the serialized DRb request to obtain the HTTPS request. The HTTPS client 308 may then initiate a communication with an HTTPS server 310 included in a server application 312. In one embodiment, the HTTPS client 308 and the HTTPS server 310 may together form an HTTPS tunnel 314 for transmitting the DRb request. HTTPS Tunneling is a technique by which communications performed using various network protocols are encapsulated using the HTTPS protocol, the network protocols in question usually belonging to the TCP/IP family of protocols. The HTTPS protocol therefore acts as a wrapper for a channel that the network protocol being tunneled uses to communicate. The HTTPS server 310 may store the code for verifying the HTTPS request and un-wrapping the HTTPS request to obtain the DRb request. The HTTPS server 310 may also be defined to forward the DRb request to a DRb server 316, which then forwards the DRb request to a Ruby object 318 included in the DRb request. The Ruby object 318 executes the DRb request to obtain a result of execution of the DRb request.

Figure 4:
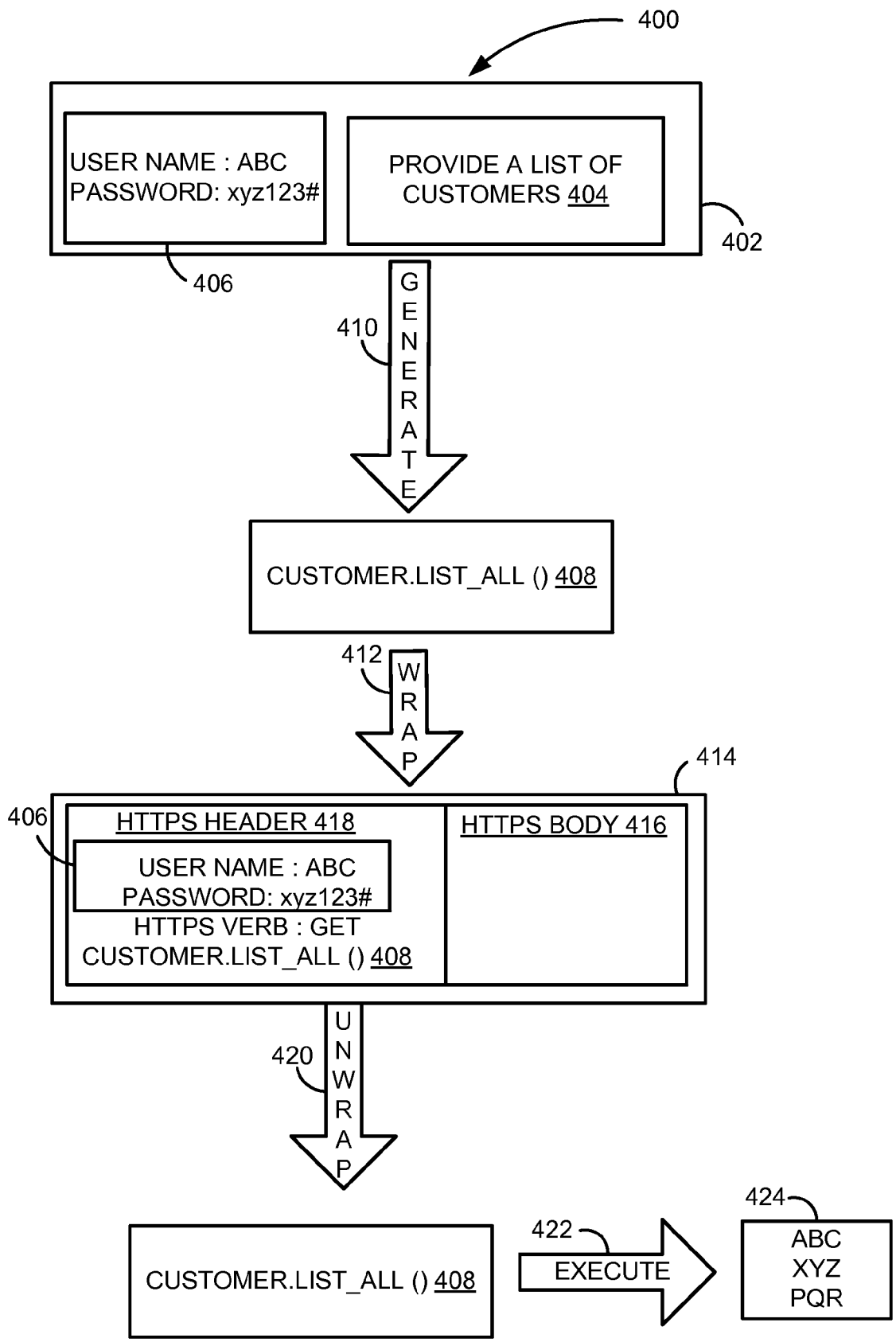
FIG. 4 is an exemplary block diagram illustrating a method for performing a secure communication, according to an embodiment.

FIG. 4 is an exemplary block diagram illustrating a method 400 for performing a secure communication, according to an embodiment. A user request 402 may be received, which includes a request 404 for providing a list of customers and authentication information 406 of the user. A DRb request "CUSTOMER.LIST_ALL( )" 408 is generated 410 based on the received user request 402. The DRb request 408 is then wrapped 412 to obtain a HTTPS request 414. The HTTPS request 414 may include an empty HTTPS body 416 and an HTTPS header 414, which stores the DRb request 408, the authentication information 406 received in the user request 402 and an HTTPS verb generated based on the DRb request 408. Verification may then be performed of the authentication information 406 stored in the HTTPS header 414 to verify the HTTPS request 414. In case the HTTPS request 414 is verified, then the HTTPS request 414 may be unwrapped 420 to obtain the DRb request 408. The DRb request 408 may finally be executed 422 to obtain the list of customers 424 requested in the user request 402.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls or web services being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
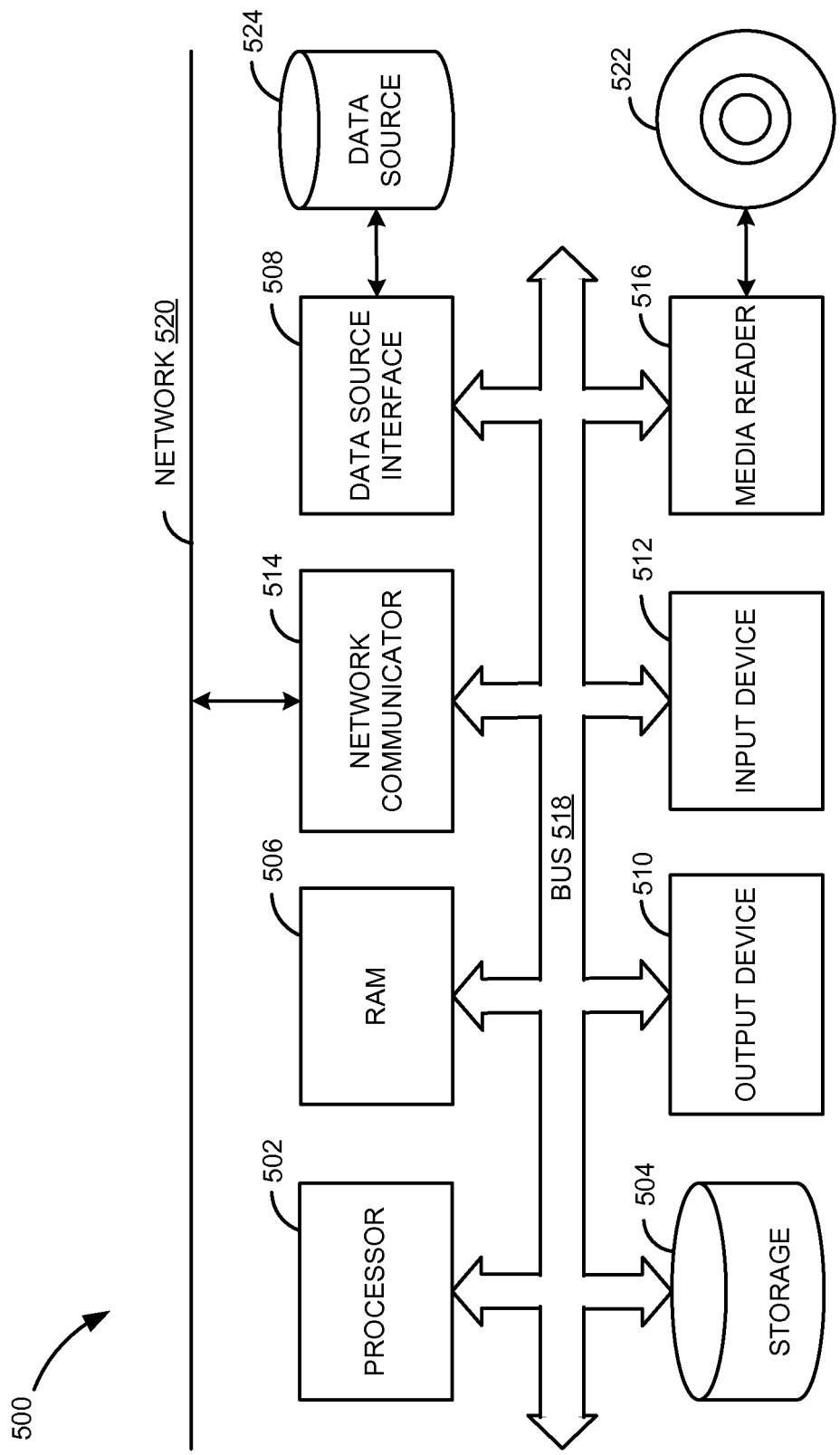
FIG. 5 is a block diagram illustrating a computing environment in which the techniques described for providing secure communication can be implemented, according to an embodiment.

FIG. 5 is a block diagram of an exemplary computer system 500. The computer system 500 includes a processor 502 that executes software instructions or code stored on a computer readable storage medium 522 to perform the above-illustrated methods of the invention. The computer system 500 includes a media reader 516 to read the instructions from the computer readable storage medium 522 and store the instructions in storage 504 or in random access memory (RAM) 506. The storage 504 provides a large space for keeping static data where at least some instructions could be stored for later execution. The stored instructions may be further compiled to generate other representations of the instructions and dynamically stored in the RAM 506. The processor 502 reads instructions from the RAM 506 and performs actions as instructed. According to one embodiment of the invention, the computer system 500 further includes an output device 510 (e.g., a display) to provide at least some of the results of the execution as output including, but not limited to, visual information to users and an input device 512 to provide a user or another device with means for entering data and/or otherwise interact with the computer system 500. Each of these output devices 510 and input devices 512 could be joined by one or more additional peripherals to further expand the capabilities of the computer system 500. A network communicator 514 may be provided to connect the computer system 500 to a network 520 and in turn to other devices connected to the network 520 including other clients, servers, data stores, and interfaces, for instance. The modules of the computer system 500 are interconnected via a bus 518. Computer system 500 includes a data source interface 508 to access data source 524. The data source 524 can be accessed via one or more abstraction layers implemented in hardware or software. For example, the data source 524 may be accessed by network 520. In some embodiments the data source 524 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

The invention claimed is:

1. A computer system for performing a secure communication comprising:
  a memory to store a program code; and
  a processor communicatively coupled to the memory, the processor configured to execute the program code to:
    generate a distributed ruby (DRb) request based on a server related request received from a user;
    wrap the generated DRb request to obtain a HTTPS request, wherein wrapping the generated DRb request includes:
      store the generated DRb request and an authentication information of the user in the HTTPS request;
      send a request for a session identification to a HTTPS server;
      receive the session identification from the HTTPS server; and
      store the session identification in the HTTPS request;
    forward the obtained HTTPS request to the HTTPS server;
    verify the authentication information stored in the forwarded HTTPS request;
    based on a result of the verification, unwrap the HTTPS request to obtain the DRb request; and
    execute the obtained DRb request to obtain a result of execution of the DRb request.

2. The computer system of claim 1, wherein the processor further executes the program code to:
  forward the obtained result of execution of the DRb request to the HTTPS server;
  wrap the obtained result, by storing the obtained result in an HTTPS result, to obtain the HTTPS result; and
  forward the obtained HTTPS result to a HTTPS client.

3. The computer system of claim 2, wherein the processor further executes the program code to:

unwrap the HTTPS result to obtain the result of execution of the DRb request; and forward the obtained result of execution to the client application.

4. The computer system of claim 1, wherein the processor further executes the program code to:

store a HTTP verb, corresponding to the DRb request, in the HTTPS request.

5. The computer system of claim 1, wherein the processor further executes the program code to:

serialize the DRb request to obtain a serialized DRb request; and store the serialized DRb request in the HTTPS request.

6. A computer implemented method for performing a secure communication, the method comprising:

based on a server related request received from a user, generating, by a client application, a distributed ruby (DRb) request;

wrapping, by a processor of the computer, the generated DRb request to obtain a HTTPS request, wherein wrapping the received DRb request includes:

storing the generated DRb request and an authentication information of the user in the HTTPS request;

a HTTPS client, sending a request for a session identification to a HTTPS server;

receiving the session identification from the HTTPS server; and storing, by the processor of the computer, the session identification in the HTTPS request;

forwarding, by the processor of the computer, the obtained HTTPS request to the HTTPS server; and receiving a result of execution of the DRb request from the HTTPS server.

7. The computer implemented method according to claim 6, further comprising:

verifying, by the processor of the computer, the user authentication information stored in the forwarded HTTPS request;

based on a result of the verification, unwrapping, by the processor of the computer, the forwarded HTTPS request to obtain the DRb request; and executing, by the processor of the computer, the DRb request to obtain the result of execution of the DRb request.

8. The computer implemented method according to claim 7, further comprising:

forwarding, by the processor of the computer, the result of execution of the DRb request to the HTTPS server;

wrapping, by the processor of the computer, the forwarded result of execution of the DRb request to obtain an HTTPS result, wherein wrapping the forwarded result of execution includes storing the result of execution of the DRb request in the HTTPS result; and forwarding, by the processor of the computer, the obtained HTTPS result to the HTTPS client.

9. The computer implemented method according to claim 8, further comprising:

unwrapping, by the processor of the computer, the HTTPS result to obtain the result of execution of the DRb request; and forwarding, by the processor of the computer, the obtained result of execution of the DRb request to the client application.

10. The computer implemented method according to claim 6, wherein wrapping the DRb request includes:

storing, by the processor of the computer, an HTTP verb, corresponding to the DRb request, in the HTTPS request.

11. The computer implemented method according to claim 6, wherein wrapping the DRb request includes:

serializing, by the processor of the computer, the DRb request to obtain a serialized DRb request; and storing, by the processor of the computer, the serialized DRB request in the HTTPS request.

12. An article of manufacture including a computer readable storage medium to tangibly store instructions, which when executed by a computer, cause the computer to:

based on a server related request received from a user, generate a Distributed Ruby (DRb) request by a client application;

wrap the generated DRb request to obtain an HTTPS request, wherein wrapping the received DRb request includes:

store the generated DRb request and an authentication information of the user in the HTTPS request;

send a request for a session identification to a HTTPS server;

receive the session identification from the HTTPS server; and store the session identification in the HTTPS request;

forward the HTTPS request to the HTTPS server; and receive a result of execution of the DRb request from the HTTPS server.

13. The article of manufacture according to claim 12, further comprising instructions which when executed by the computer further causes the computer to:

verify the user authentication information included in the received HTTPS request;

based on a result of the verification, unwrap the received HTTPS request to obtain the DRb request;

forward the obtained DRb request to a DRb server; and execute the DRb request to obtain the result of execution of the DRb request.

14. The article of manufacture according to claim 13, further comprising instructions which when executed by the computer further causes the computer to:

forward the result of execution of the DRb request to the HTTPS server;

wrap the forwarded result of execution of the DRb request to obtain a HTTPS result, wherein wrapping includes storing the result in the HTTPS result; and forward the obtained HTTPS result a HTTPS client.

15. The article of manufacture according to claim 14, further comprising instructions which when executed by the computer further causes the computer to:

unwrap the HTTPS result to obtain the result of execution of the DRb request; and forward the obtained result of execution of the DRb request to the client application.

16. The article of manufacture according to claim 12, further comprising instructions which when executed by the computer further causes the computer to:

store a HTTP verb corresponding to the DRb request in the HTTPS request.

17. The article of manufacture according to claim 12, further comprising instructions which when executed by the computer further causes the computer to:

serialize the DRb request to obtain a serialized DRb request; and store the serialized DRb request in the HTTPS request.

* * * * *